(12) United States Patent
Matsuura et al.

(10) Patent No.: US 12,070,939 B2
(45) Date of Patent: Aug. 27, 2024

(54) PRINTING APPARATUS AND PRINTING METHOD

(71) Applicant: CANON KABUSHIKI KAISHA, Tokyo (JP)

(72) Inventors: Masaaki Matsuura, Kawasaki (JP); Seiji Ogasawara, Machida (JP); Takaaki Ishida, Kawasaki (JP); Masakazu Tsukuda, Yokohama (JP); Shuichi Tokuda, Kawasaki (JP); Kazuki Matsuo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 17/508,318

(22) Filed: Oct. 22, 2021

(65) Prior Publication Data

US 2022/0041388 A1 Feb. 10, 2022

Related U.S. Application Data

(62) Division of application No. 16/220,871, filed on Dec. 14, 2018, now Pat. No. 11,167,945.

(30) Foreign Application Priority Data

Dec. 19, 2017 (JP) ................. 2017-243016

(51) Int. Cl.
*B41J 13/00* (2006.01)
*B41J 13/03* (2006.01)
(Continued)

(52) U.S. Cl.
CPC .......... *B41J 13/0027* (2013.01); *B41J 13/03* (2013.01); *B65H 5/068* (2013.01); *B65H 7/20* (2013.01);
(Continued)

(58) Field of Classification Search
CPC .......... B65H 5/06; B65H 5/062; B65H 5/068; B65H 7/00; B65H 7/18; B65H 7/20;
(Continued)

(56) References Cited

U.S. PATENT DOCUMENTS 4,849,787 A * 7/1989 Honjo .................... G03G 15/60
399/185
4,974,828 A 12/1990 Matsuo et al.
(Continued)

FOREIGN PATENT DOCUMENTS

JP          06-000960 A      1/1994
JP          2001-039552 A    2/2001

*Primary Examiner* — Prasad V Gokhale
(74) *Attorney, Agent, or Firm* — Venable LLP

(57) ABSTRACT

For a printing apparatus, a first conveyance speed for a first printing medium is determined according to first print data to be printed on the first printing medium and a second conveyance speed for a second printing medium is determined according to second print data to be printed on the second printing medium that follows the first printing medium along a conveying path. In a case where the second conveyance speed is equal to the first conveyance speed, a conveyance operation of the second printing medium is started before the first printing medium is discharged from the conveying path. In a case where the second conveyance speed is different from the first conveyance speed, the conveyance operation of the second printing medium is started after the first printing medium is discharged from the conveying path.

23 Claims, 17 Drawing Sheets

(51) Int. Cl.
  *B65H 5/06* (2006.01)
  *B65H 7/20* (2006.01)
  *H04N 1/00* (2006.01)
(52) U.S. Cl.
  CPC ..... *H04N 1/00602* (2013.01); *B65H 2513/10* (2013.01); *B65H 2513/512* (2013.01); *B65H 2601/2525* (2013.01)
(58) Field of Classification Search
  CPC .............. B65H 29/20; B65H 2511/415; B65H 2513/10; B65H 2513/104; B65H 2513/50; B65H 2513/514; B65H 2601/2525; B41J 13/0027; B41J 13/03; H04N 1/00602
  See application file for complete search history.

(56) References Cited

U.S. PATENT DOCUMENTS

| | | | |
|---|---|---|---|
| 6,702,274 B1 | 3/2004 | Otsuka | |
| 6,733,009 B2 | 5/2004 | Ogasawara | |
| 6,978,992 B2 | 12/2005 | Otsuka | |
| 10,574,851 B2 * | 2/2020 | Yoshikaie | H04N 1/00602 |
| 2009/0160118 A1 * | 6/2009 | Purcell | B65H 7/02 271/3.14 |
| 2013/0279960 A1 * | 10/2013 | Kobayashi | B41J 13/0009 399/381 |
| 2017/0282620 A1 * | 10/2017 | Samoto | B41J 29/393 |
| 2018/0198943 A1 * | 7/2018 | Yoshikaie | H04N 1/047 |

* cited by examiner

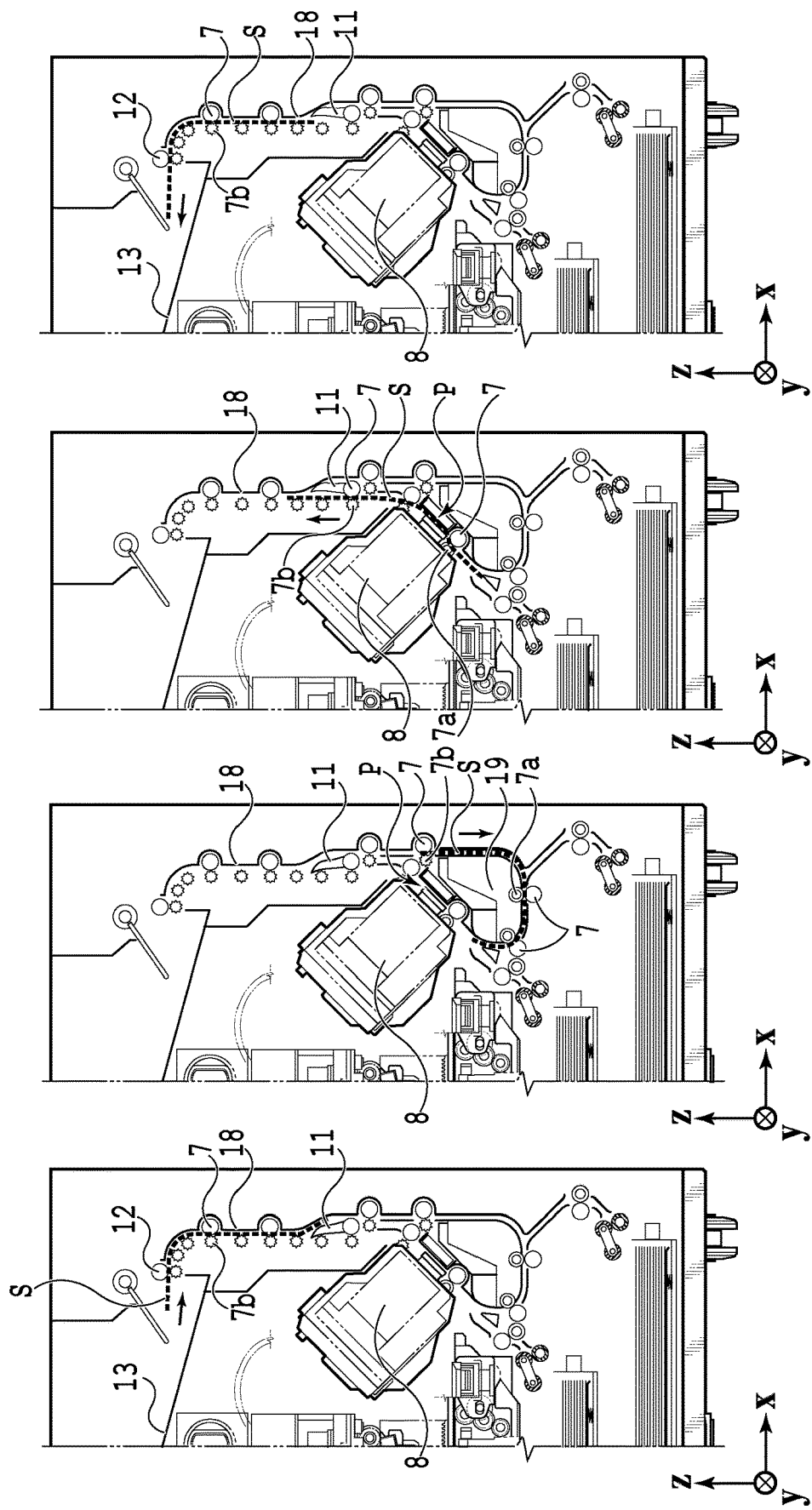

| DOT-COUNT VALUE | CONVEYANCE SPEED V BASED ON ENTIRE PAGE |
|---|---|
| DC ≦ A | 26ips |
| A < DC ≦ B | 14.5ips |
| B < DC | 8ips |

FIG.10A

| DOT-COUNT VALUE | CONVEYANCE SPEED V BY INK COLOR | | | |
|---|---|---|---|---|
| | C | M | Y | BK |
| DC ≦ C | 26ips | 26ips | 26ips | 26ips |
| C < DC ≦ D | 14.5ips | 14.5ips | 14.5ips | 14.5ips |
| D < DC | 8ips | 8ips | 8ips | 8ips |

FIG.10B

| DOT-COUNT VALUE | CONVEYANCE SPEED V BASED ON UNIT AREA |
|---|---|
| DC ≦ E | 26ips |
| E < DC ≦ F | 14.5ips |
| F < DC | 8ips |

FIG.10C

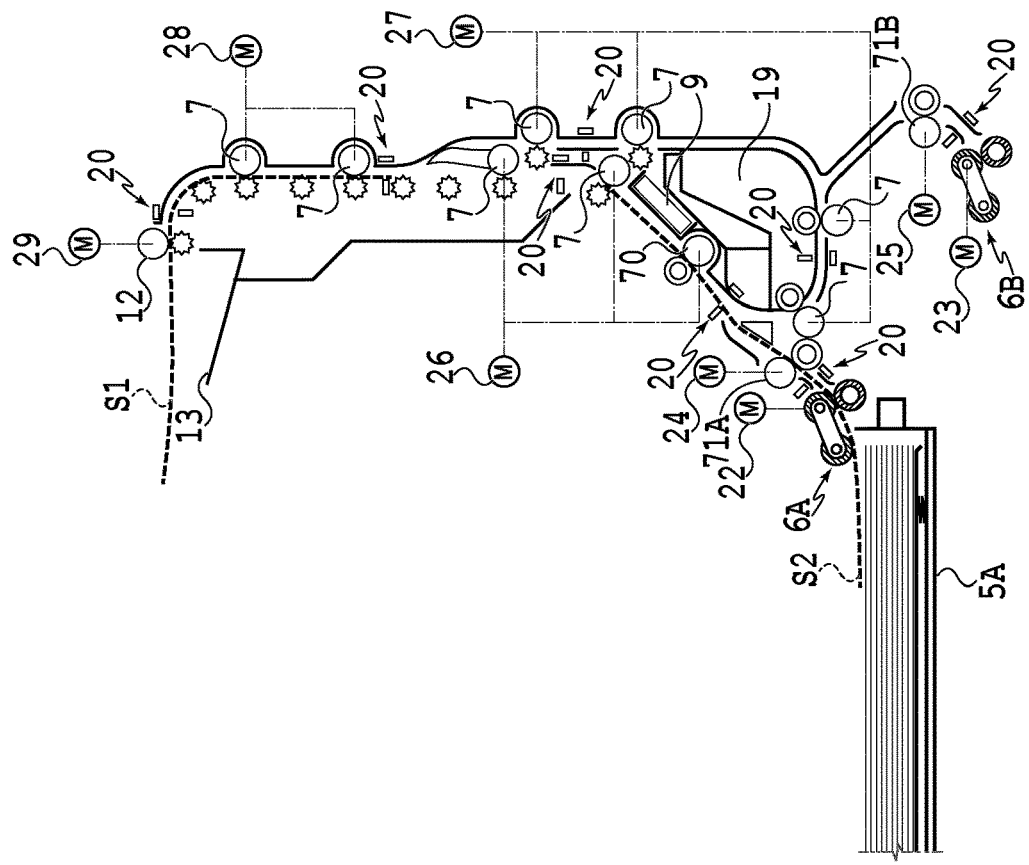
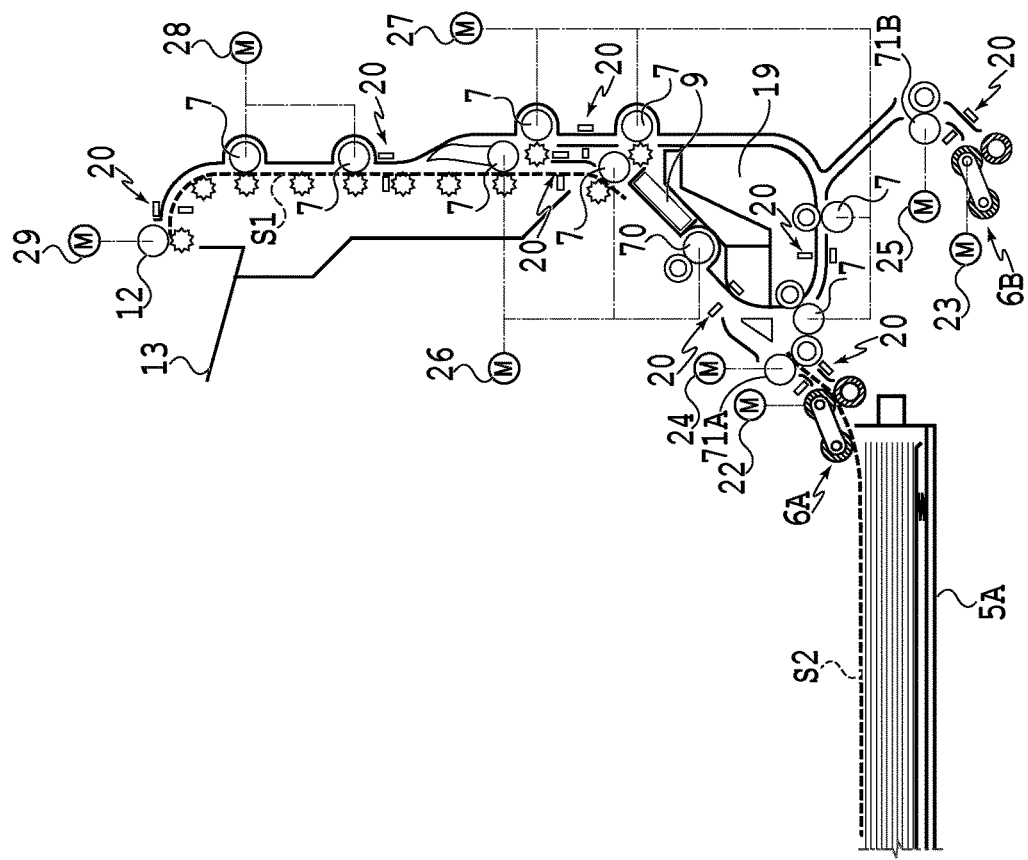

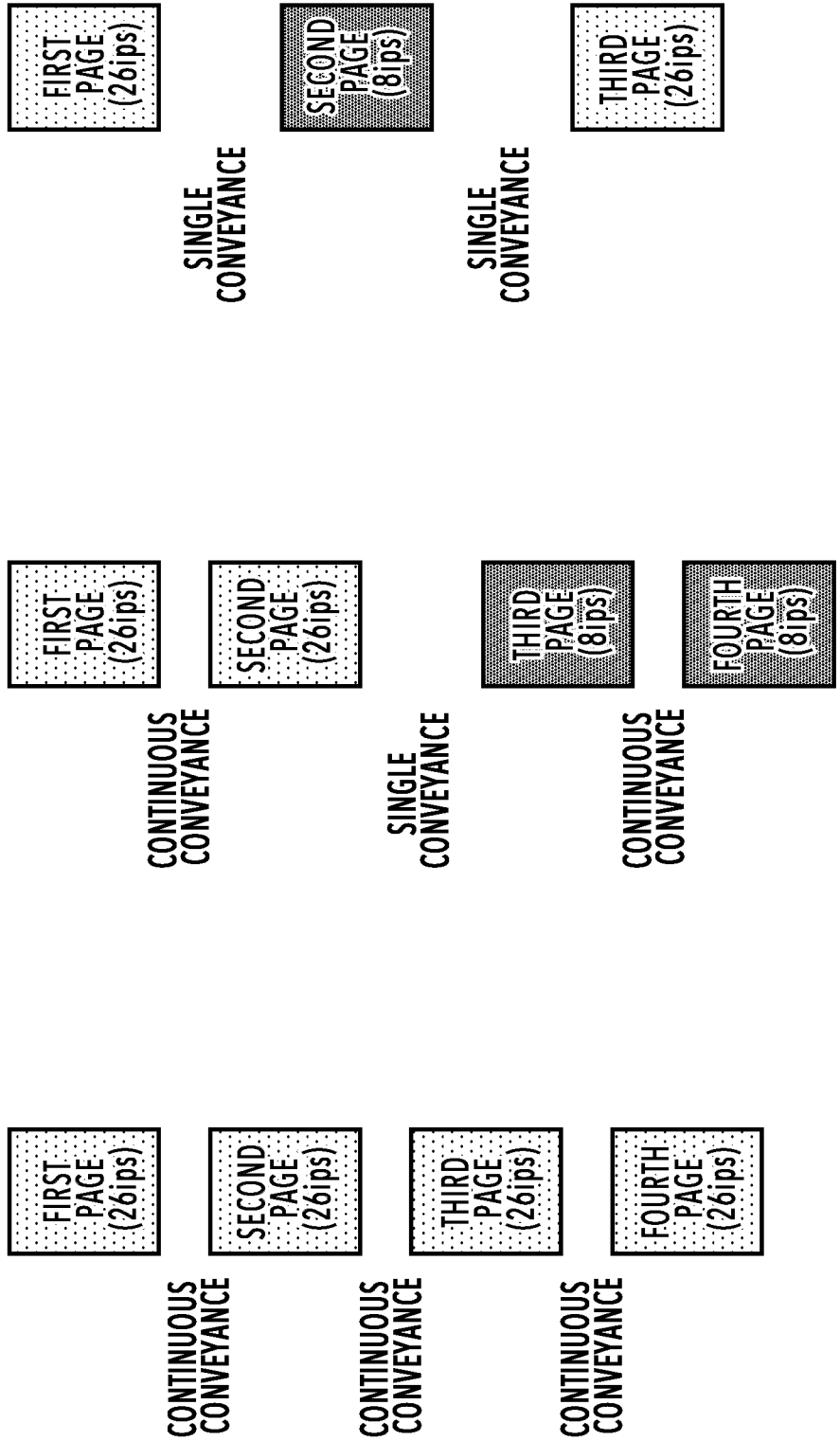

| INTER-PAGE DISTANCE | | FOLLOWING SHEET | | |
|---|---|---|---|---|
| | | 26ips | 14.5ips | 8ips |
| PRECEDING SHEET | 26ips | PL1 | PL1 − (PL1×26÷14.5) | PL1 − (PL1×26÷8) |
| | 14.5ips | PL2 + (PL2×14.5÷26) | PL2 | PL2 − (PL2×14.5÷8) |
| | 8ips | PL3 + (PL3×8÷26) | PL3 + (PL3×8÷14.5) | PL3 |

FIG.16

PRINTING APPARATUS AND PRINTING METHOD

BACKGROUND OF THE INVENTION

Field of the Invention

The present invention relates to conveyance control of printing medium in a printing apparatus of a full line type.

Description of the Related Art

Japanese Patent Laid-Open No. 2001-39552 discloses a serial type printing apparatus with a configuration in which two sheets are simultaneously supported at different positions in the conveying path to perform continuous printing efficiently. According to Japanese Patent Laid-Open No. 2001-39552, before a paper sensor detects the trailing edge of a preceding sheet, feeding of the succeeding sheet starts, and the timing of conveying the succeeding sheet is controlled such that after the paper sensor detects the trailing edge of the preceding sheet, the paper sensor detects the leading edge of the succeeding sheet.

Meanwhile, Japanese Patent Laid-Open No. H6-960 (1994) discloses a configuration of an inkjet printing apparatus of a full line type in which when an image has a high printing density, the conveyance speed of the sheet is set at a low speed to keep the drive frequency of the print head low so that the power consumption will not exceed the upper limit of the electric capacity.

However, in the case of a relatively large printing apparatus having a long conveying path, if the conveyance speed is changed on an individual sheet basis as disclosed in Japanese Patent Laid-Open No. H6-960 (1994), two sheets may need to be conveyed simultaneously in different positions in the conveying path, making the control difficult. For example, in a case where the conveyance speed of the succeeding sheet is set higher than the conveyance speed of the preceding sheet, even though a certain interval is provided between the trailing edge of the preceding sheet and the leading edge of the succeeding sheet as in Japanese Patent Laid-Open No. 2001-39552, the succeeding sheet may catch up with the preceding sheet and cause a paper jam or the like.

SUMMARY OF THE INVENTION

The present invention has been made to solve the above problem. Thus, an object thereof is to provide a printing apparatus of a full line type and a printing method that are capable of continuously printing multiple sheets efficiently without causing a paper jam or the like.

According to a first aspect of the present invention, there is provided a printing apparatus comprising: a conveyance unit configured to convey a first printing medium and a second printing medium that follows the first printing medium along a conveying path; a line type print head disposed in the conveying path and configured to print on a printing medium according to print data; a determination unit configured to determine a first conveyance speed for the first printing medium according to first print data to be printed on the first printing medium, and determine a second conveyance speed for the second printing medium according to second print data to be printed on the second printing medium; and a control unit configured to control the conveyance unit, wherein in a case where the second conveyance speed is equal to the first conveyance speed, the control unit starts conveyance operation of the second printing medium before the first printing medium is discharged from the conveying path, and in a case where the second conveyance speed is different from the first conveyance speed, the control unit starts the conveyance operation of the second printing medium after the first printing medium is discharged from the conveying path.

According to a second aspect of the present invention, there is provided a printing apparatus comprising: a conveyance unit configured to convey a first printing medium and a second printing medium that follows the first printing medium along a conveying path; a line type print head disposed in the conveying path and configured to print on a printing medium according to print data; a determination unit configured to determine a first conveyance speed for the first printing medium according to first print data to be printed on the first printing medium, and determine a second conveyance speed for the second printing medium according to second print data to be printed on the second printing medium; and a control unit configured to control the conveyance unit, wherein in a case where the second conveyance speed is equal to the first conveyance speed, the control unit starts conveyance of the second printing medium with a specified distance from the first printing medium while the first printing medium is being conveyed in the conveying path, in a case where the second conveyance speed is lower than the first conveyance speed, the control unit starts the conveyance of the second printing medium with a distance shorter than the specified distance from the first printing medium while the first printing medium is being conveyed in the conveying path, and in a case where the second conveyance speed is higher than the first conveyance speed, the control unit starts the conveyance of the second printing medium with a distance longer than the specified distance from the first printing medium while the first printing medium is being conveyed in the conveying path.

According to a third aspect of the present invention, there is provided a printing method comprising: a conveyance step of conveying a first printing medium and a second printing medium that follows the first printing medium along a conveying path; a printing step of printing on a printing medium according to print data, using a line type print head disposed in the conveying path; a determination step of determining a first conveyance speed for the first printing medium according to first print data to be printed on the first printing medium, and determining a second conveyance speed for the second printing medium according to second print data to be printed on the second printing medium; and a control step of controlling the conveyance step, wherein in the control step, in a case where the second conveyance speed is equal to the first conveyance speed, conveyance operation of the second printing medium is started before the first printing medium is discharged from the conveying path, and in a case where the second conveyance speed is different from the first conveyance speed, the conveyance operation of the second printing medium is started after the first printing medium is discharged from the conveying path.

Further features of the present invention will become apparent from the following description of exemplary embodiments with reference to the attached drawings.

BRIEF DESCRIPTION OF THE DRAWINGS

FIGS. 6A to 6D are diagrams illustrating the conveying path in the case of performing print operation on the back side of the printing medium;

FIGS. 10A to 10C are diagrams illustrating the relationship between the type of dot count value and conveyance speed V;

FIGS. 11A and 11B are diagrams illustrating a state of "continuous conveyance";

FIGS. 12A to 12C are diagrams illustrating conveyance examples in the first embodiment;

FIG. 16 is a diagram illustrating an inter-page distance PL setting table; and

DESCRIPTION OF THE EMBODIMENTS

First Embodiment

Figure 1:
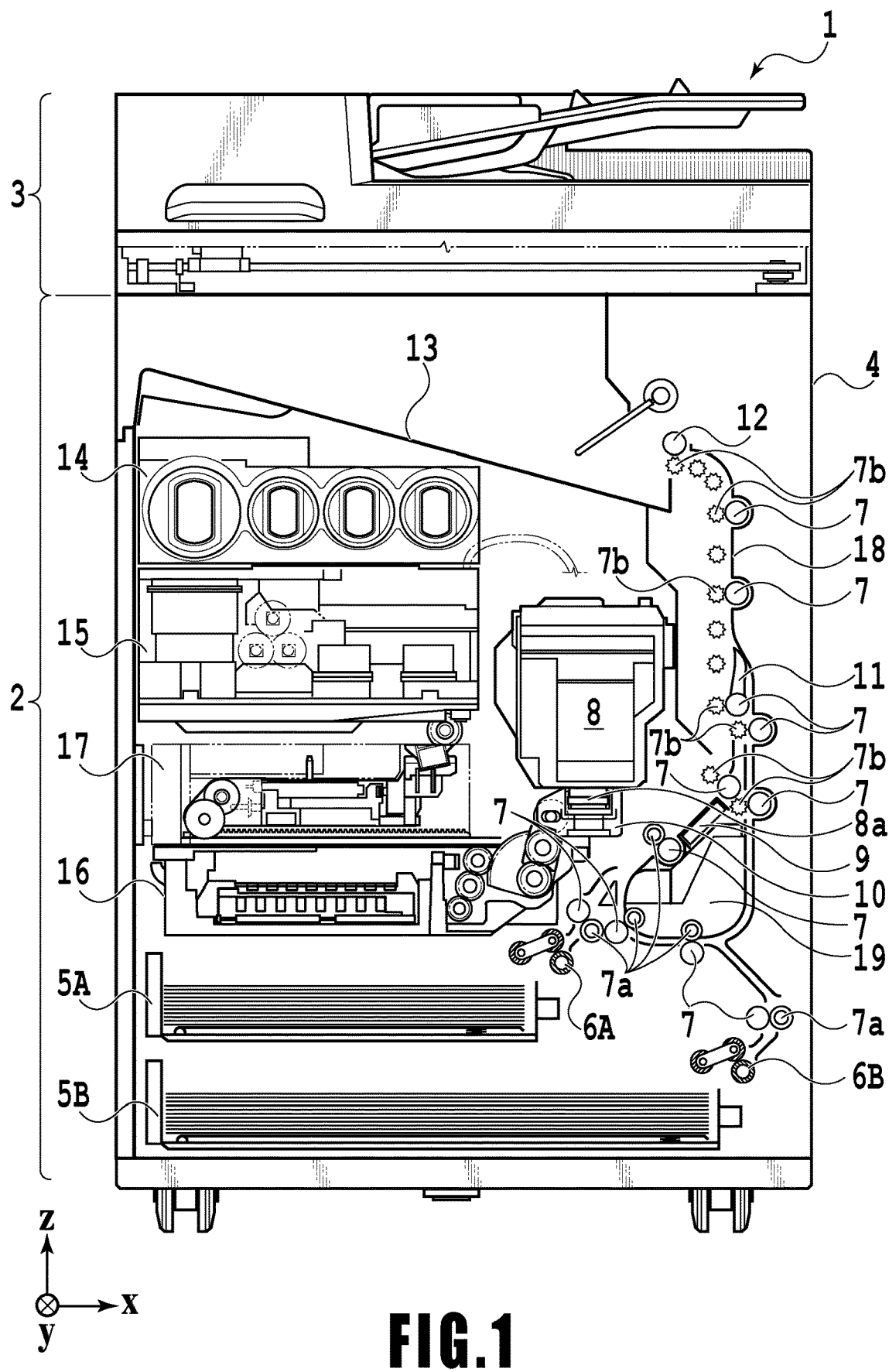
FIG. 1 is a diagram illustrating a printing apparatus on standby.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing printing medium (cut sheets) S are detachably provided at the bottom of a casing 4 in the vertical direction. Relatively small printing media of up to A4 size are stacked and housed in the first cassette 5A and relatively large printing media of up to A3 size are stacked and housed in the second cassette 5B. A first feeding unit 6A for feeding housed printing media one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7a, spurs 7b, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7a are follower rollers that are turned while nipping a print medium S together with the conveying rollers 7. The discharging roller 12 is a drive roller located downstream of the conveying rollers 7 and driven by the conveying motor (not shown). The spurs 7b nip and convey a print medium S together with the conveying rollers 7 and discharging roller 12 located downstream of the print head 8.

In the printing apparatus, a plurality of motors are provided for driving the drive rollers. Each roller is connected to one of the plurality of motors. Relationships between multiple motors and drive rollers will be explained later.

The guide 18 is disposed in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing printing media S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head is configured to eject inks of a plurality of colors. When the print head 8 is in a standby position, an ejection opening surface 8a of the print head 8 is oriented vertically downward and capped with a cap unit 10 as shown in FIG. 1. In print operation, the orientation of the print head 8 is changed by a print controller 202 described later such that the ejection opening surface 8a faces a platen 9. The platen 9 includes a flat plate extending in the y-direction and supports a print medium S being subjected to print operation by the print head 8 from the back side. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
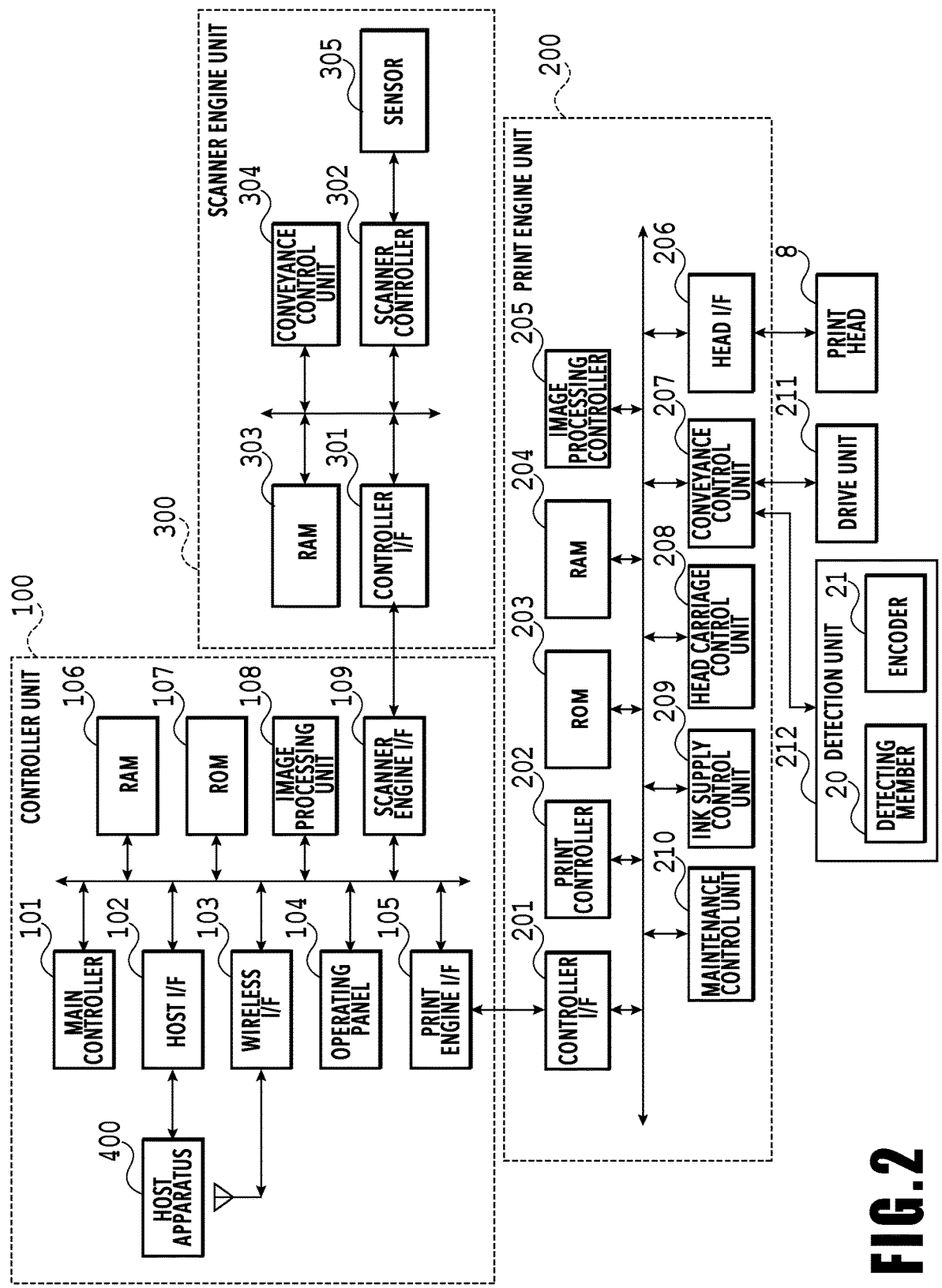
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine IT 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller FF 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207.

The conveyance control unit 207 is connected with a detection unit 212 and a driving unit 211 and controls a conveyance of the print medium S using the driving unit 211 based on a result of a detection of the detection unit 212. The detection unit 212 includes detection members 20 detecting presence of the print medium S and encoders detecting amounts of rotation of the driving rollers.

The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller FF 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
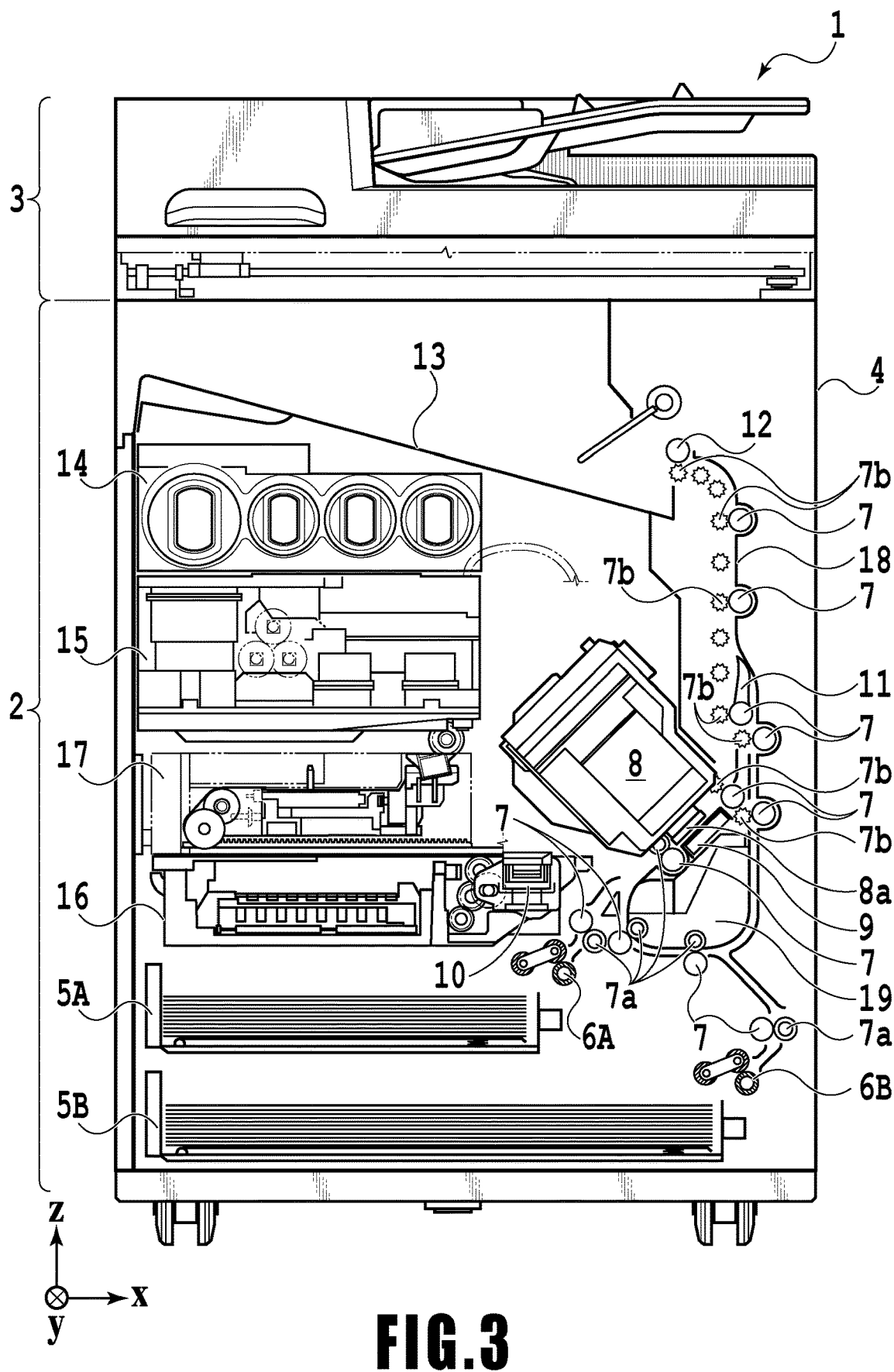
FIG. 3 is a diagram illustrating the printing apparatus in printing.

FIG. 3 shows the printing apparatus 1 in a printing state. As compared with the standby state shown in FIG. 1, the cap unit 10 is separated from the ejection opening surface 8a of the print head 8 and the ejection opening surface 8a faces the platen 9. In the present embodiment, the plane of the platen 9 is inclined about 45 degrees with respect to the horizontal plane. The ejection opening surface 8a of the print head 8 in a printing position is also inclined about 45 degrees with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10a from the ejection opening surface 8a of the print head 8. The print controller 202 then uses the head carriage control unit 208 to turn the print head 8 45 degrees while adjusting the vertical height of the print head 8 such that the ejection opening surface 8a faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4C:
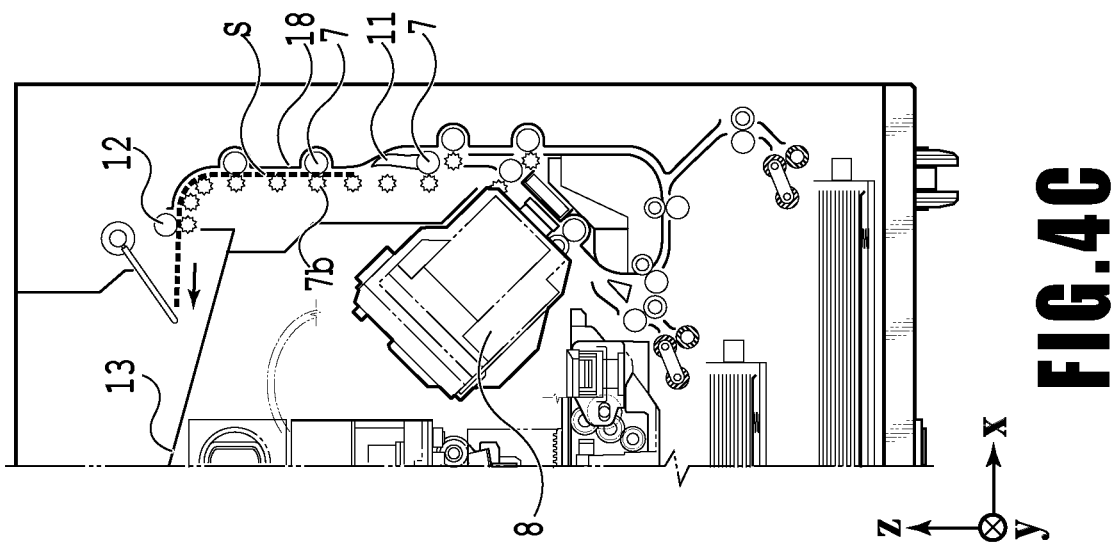
FIGS. 4A to 4C are diagrams illustrating the conveying path of the printing medium fed from a first cassette.
Figure 4B:
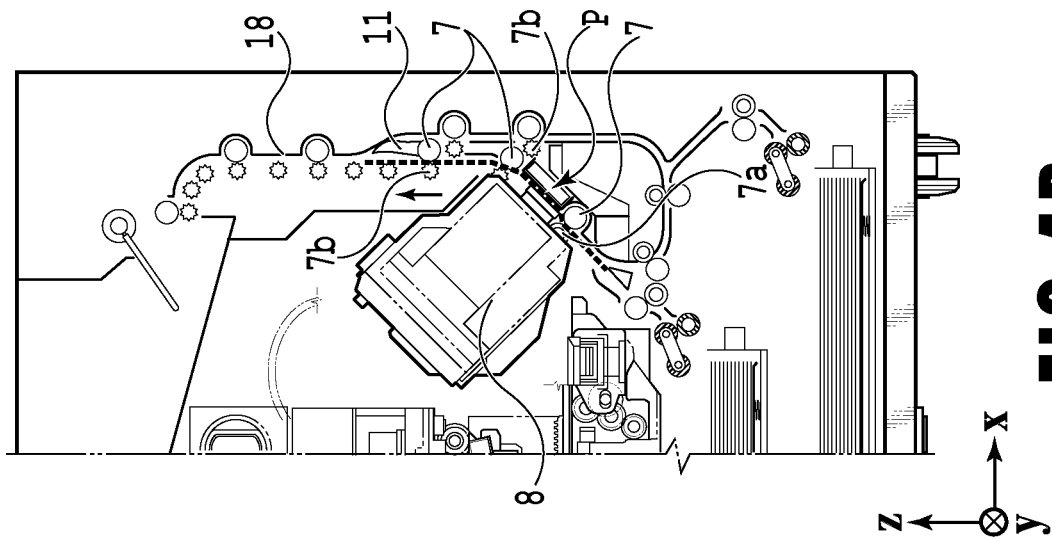
Figure 4A:
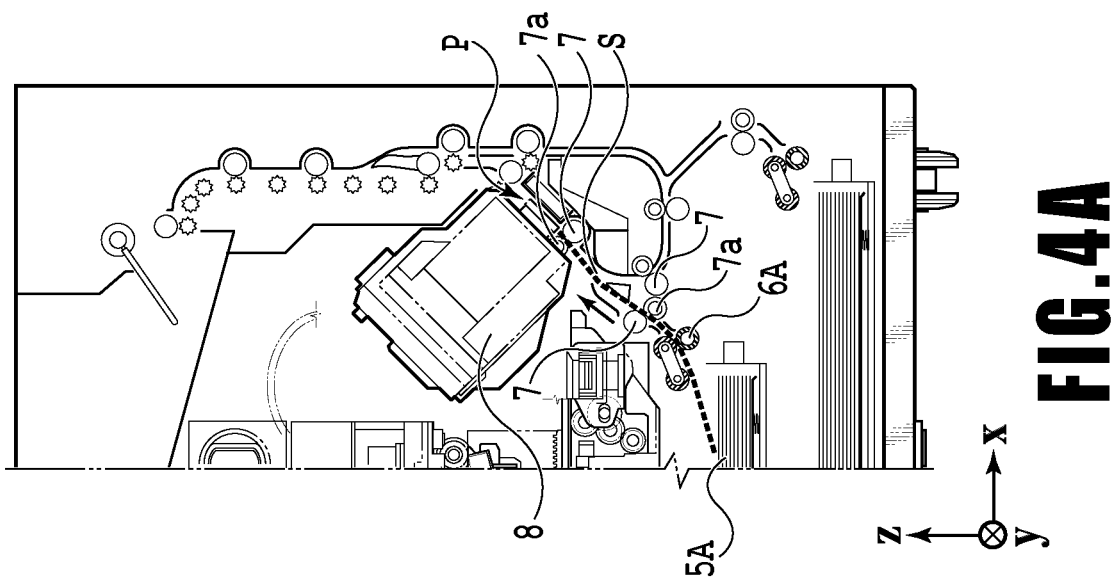

FIGS. 4A to 4C are diagrams showing a conveying path in the case of feeding an A4 size print medium S from the first cassette 5A. A print medium S at the top of a stack of printing media in the first cassette 5A is separated from the rest of the stack by the first feeding unit 6A and conveyed toward a print area P between the platen 9 and the print head 8 while being nipped between the conveying rollers 7 and the pinch rollers 7a. FIG. 4A shows a conveying state where the front end of the print medium S is about to reach the print area P. The direction of movement of the print medium S is changed from the horizontal direction (x-direction) to a direction inclined about 45 degrees with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8a and the print medium S. After ink is applied to the print medium S, the conveying rollers 7 and the spurs 7b guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7b change the direction of movement of the print medium S from the direction inclined about 45 degrees with respect to the horizontal direction in the print area P to the vertically upward direction.

After being conveyed vertically upward, the print medium S is discharged into the discharging tray 13 by the discharging roller 12 and the spurs 7b. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

Figure 5A:
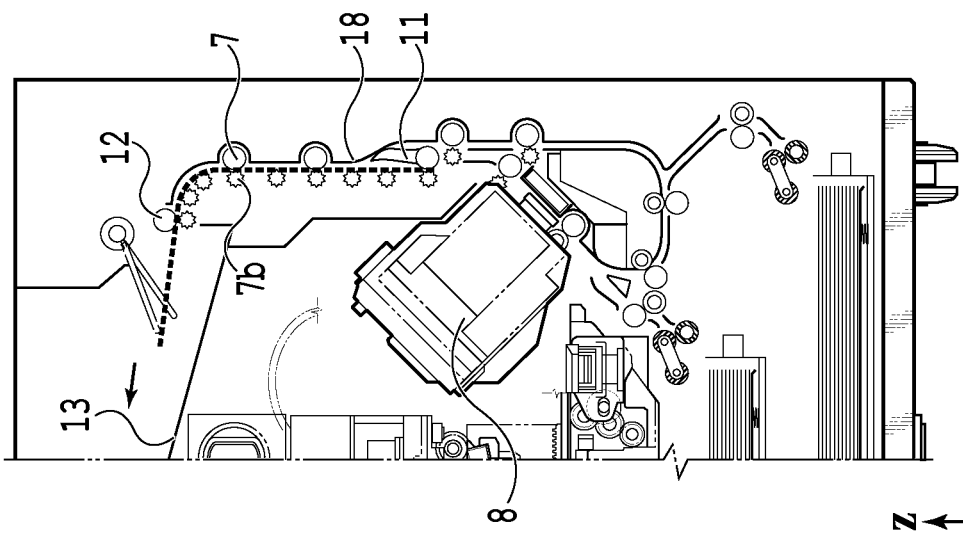
FIGS. 5A to 5C are diagrams illustrating the conveying path of the printing medium fed from a second cassette.
Figure 5B:
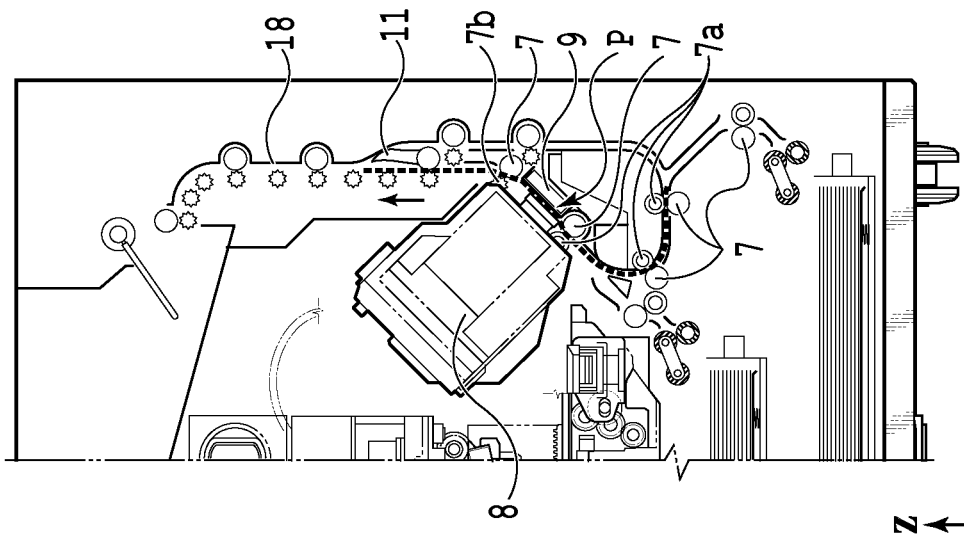
Figure 5C:
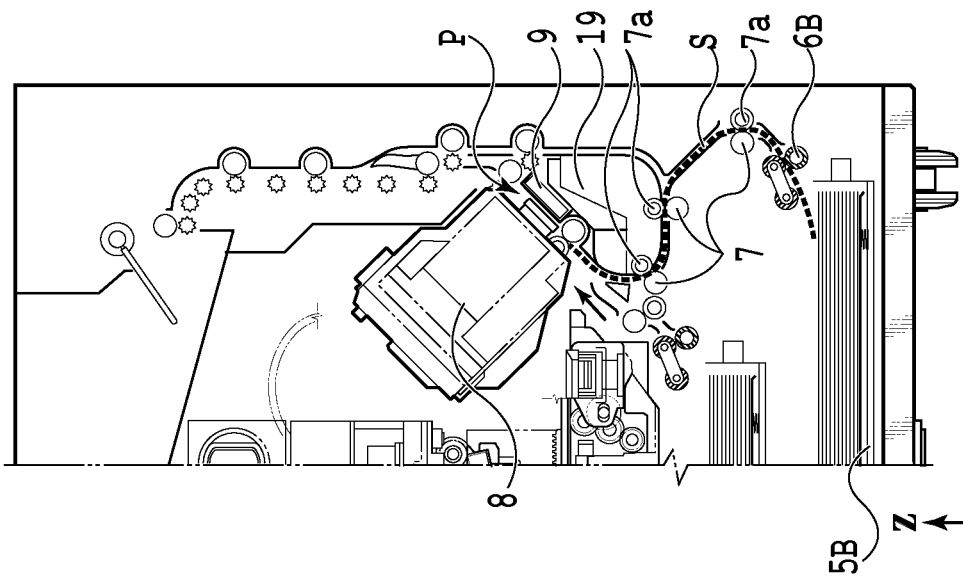

FIGS. 5A to 5C are diagrams showing a conveying path in the case of feeding an A3 size print medium S from the second cassette 5B. A print medium S at the top of a stack of printing medium in the second cassette 5B is separated from the rest of the stack by the second feeding unit 6B and conveyed toward the print area P between the platen 9 and the print head 8 while being nipped between the conveying rollers 7 and the pinch rollers 7a.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7a, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

After the print head 8 finishes print operation for the first side and the back end of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8a of the print head 8. FIG. 6B shows a conveying state where the front end of the print medium S is about to reach the print area P for print operation for the second side.

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
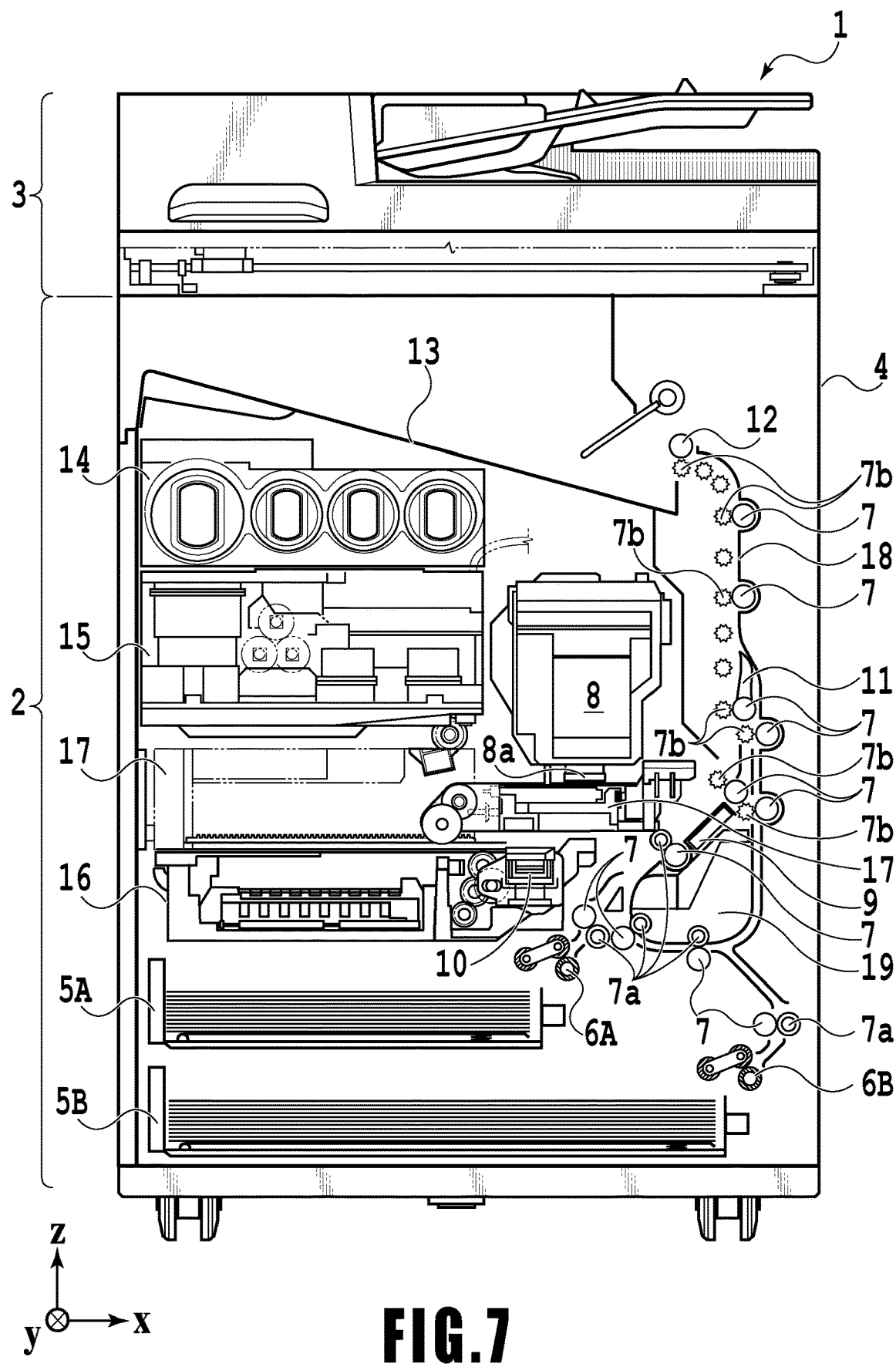
FIG. 7 is a diagram illustrating the printing apparatus in a maintenance mode.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45 degrees. The print controller 202 then moves the wiping unit 17 from the evacuation position to the right. Following that, the print controller 202 moves the print head 8 vertically downward to the maintenance position where maintenance operation can be performed.

Figure 8:
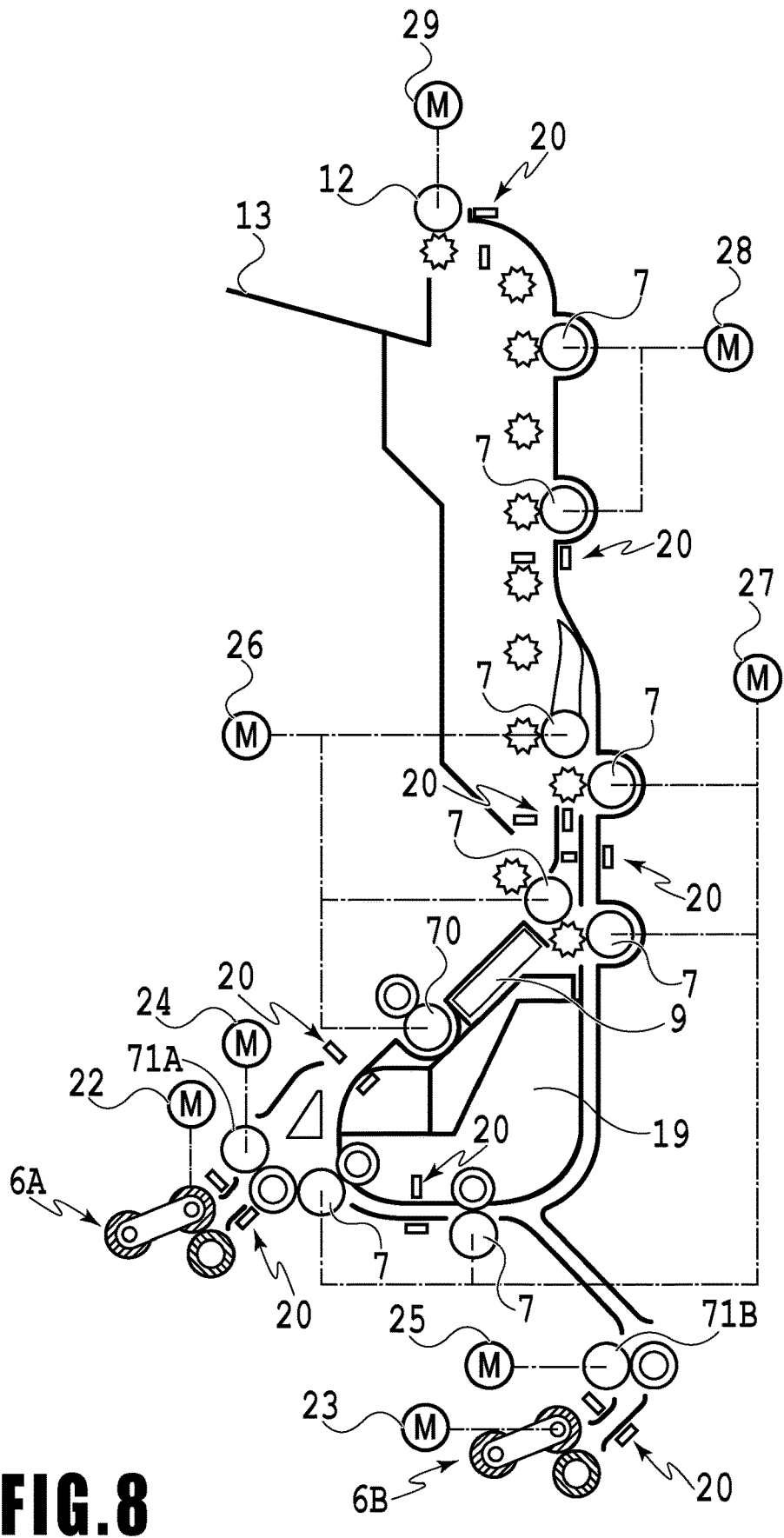
FIG. 8 is a diagram illustrating the relationship between drive rollers and motors.

FIG. 8 is a diagram illustrating the relationships between multiple motors and drive rollers in the printing apparatus 1. A first feeding motor 22 drives the first feeding unit 6A for feeding printing media S from the first cassette 5A. A second feeding motor 23 drives the second feeding unit 6B for feeding printing media S from the second cassette 5B. A first conveying motor 24 drives a first intermediate roller 71A which first conveys a printing medium S fed by the first feeding unit 6A. A second conveying motor 25 drives a second intermediate roller 71B which first conveys a printing medium S fed by the second feeding unit 6B.

A main conveying motor 26 drives a main conveying roller 70 which is disposed upstream of the platen 9 and mainly conveys the printing medium S being printed. The main conveying motor 26 also drives two conveying rollers 7 that are disposed downstream of the platen 9 and conveys the printing medium S conveyed by the main conveying roller 70, further downstream.

A third conveying motor 27 drives two conveying rollers 7 that convey downward the printing medium S, the first side of which has been printed. The third the conveying motor 27 also drives two conveying rollers 7 disposed along the inner guide 19. These two conveying rollers 7 convey, toward the print head 8, a printing medium S fed from the second cassette 5B and conveyed by the second intermediate roller 71B or a printing medium S, the first side of which has been printed and the front and back sides have been reversed.

A fourth conveying motor 28 drives two conveying rollers 7 that convey upward or downward a printing medium S that has been printed. A discharging motor 29 drives a discharging roller 12 for discharging a printing medium S that has been printed to the discharging tray 13. As described above, the two feeding motors 22 and 23, the five conveying motors 24 to 28, and the discharging motor 29 each are associated with one or more drive rollers.

In addition, at eight positions along the conveying path are disposed detection members 20 for detecting the printing medium S. Each detection member 20 includes a sensor and mirror disposed on opposite sides of the conveying path. The sensor having a light emitting unit and a light receiving unit is disposed on one side of the conveying path, and the mirror is disposed on the other side of the conveying path, at a position facing the sensor. Each detection member 20 checks whether the light receiving unit has detected light emitted from the light emitting unit of the sensor and then reflected by the mirror to judge whether a printing medium S is present, in other words, whether the leading edge or the trailing edge has passed.

The conveyance control unit 207 drives the feeding motors 22 and 23, the conveying motors 24 to 28, and the discharging motor 29 separately based on detection results of the multiple detection members 20 and the output values of encoders for detecting the amount of rotation of the drive rollers, and thus controls the conveyance operation of the entire apparatus.

The conveyance control unit 207 of the present embodiment, based on the conveyance speed and conveyance mode set for each page, separately drives the drive motors connected to the drive rollers supporting each page. The above conveyance speed and conveyance mode are set for each page by the print controller 202 analyzing a received print job and are managed in the RAM 204. Hereinafter, description will be provided for a method of setting the conveyance speed and conveyance mode.

As for the multiple ejection openings arrayed in the print head 8, the number of ejection openings that eject ink at the same time and the ejection (drive) frequency of each ejection opening vary depending on image data. The larger these values, the more likely the power consumption exceeds the capacity of the power source of the printing apparatus.

For this reason, in the present embodiment, the drive frequency of the print head 8 is set for each page depending on the image data, and the conveyance speed of the printing medium S also changes to correspond to the set drive frequency. For example, when printing a monochrome document using only black ink, the drive frequency of the print head 8 is set relatively high, and the conveyance speed of the printing medium S is set relatively high. On the other hand, when printing a color image using four color inks at high density, the drive frequency of the print head 8 is set relatively low, and the conveyance speed of the printing medium S is set relatively low.

Figure 9:
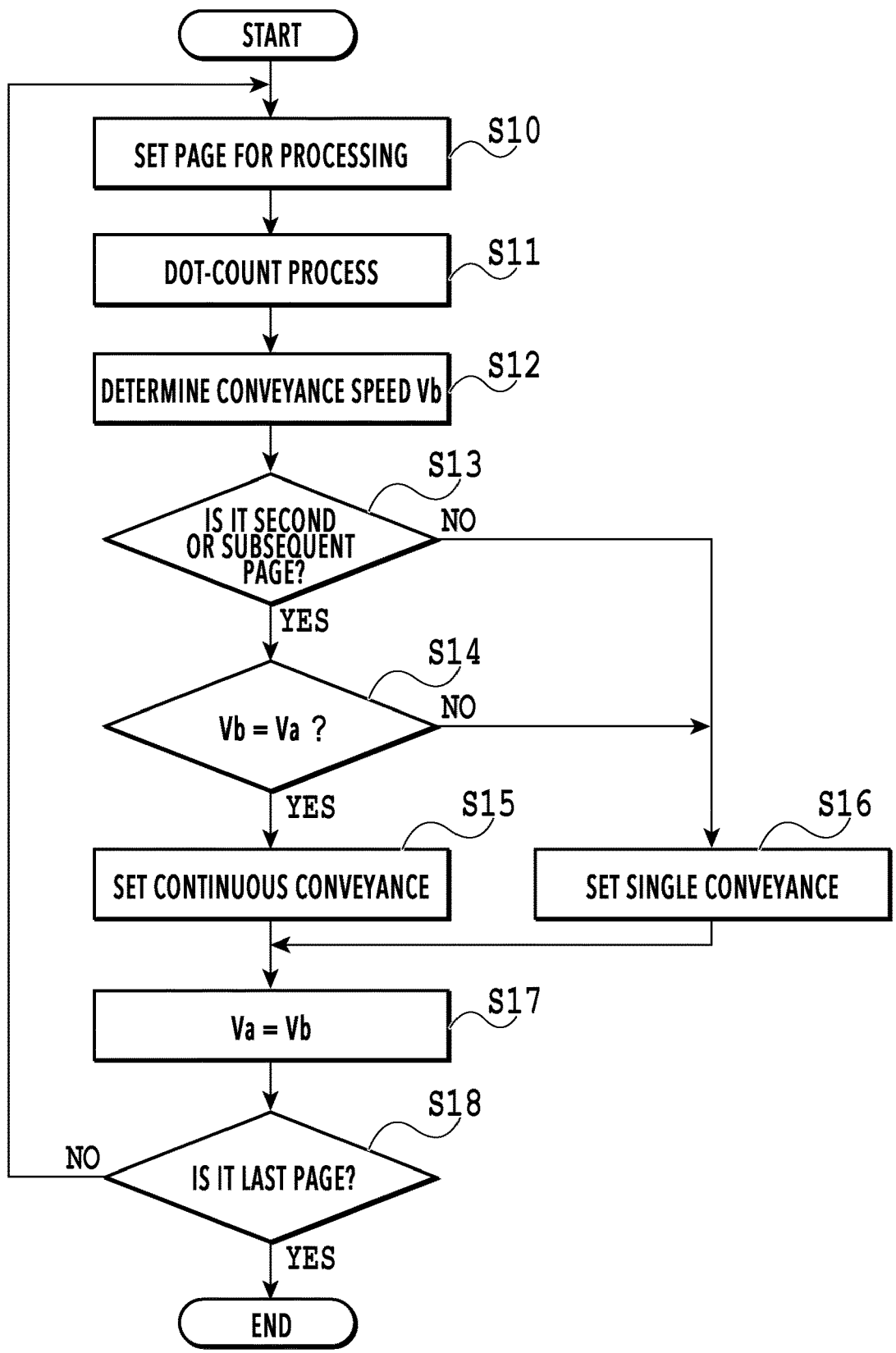
FIG. 9 is a flowchart illustrating a conveyance mode setting process in a first embodiment.

FIG. 9 is a flowchart for explaining a conveyance mode setting process executed by the print controller 202 when the print engine unit 200 receives a print job. Through this conveyance mode setting process, the conveyance speed and conveyance mode are set individually for each of the multiple pages included in the same print job. Note that this process is executed by the print controller 202 according to a program stored in the ROM 203, using the RAM 204 as a work area.

When this process starts, the print controller 202 sets a page for processing at step S10. When this is the first time to do this step, the first page is set as the page for processing.

At step S11, the print controller 202 performs a dot-count process on the page for processing. Specifically, the print controller 202 inspects the print data in which dot-printing (1) or no dot-printing (0) is set for each pixel and counts the number of pixels for which dot-printing (1) is set. In addition, at step S12, the print controller 202 determines conveyance speed Vb for the page for processing based on the count value acquired at step S11.

FIGS. 10A to 10C are diagrams illustrating the type of count value acquired in the dot-count process at step S11 and relationships between the count value of each type and conveyance speed V. FIG. 10A illustrates the relationship between the count value for the entire page and conveyance speed V, FIG. 10B illustrates the relationship between the count value for each ink color and conveyance speed V, and FIG. 10C illustrates the relationship between the count value for a unit area and conveyance speed V.

Count value DC for the entire page means the total count value for all the ink colors on the entire page. In the present embodiment, as illustrated in FIG. 10A, two thresholds A and B are prepared. When count value DC satisfies DC≤A, the conveyance speed is temporarily set as V=26 ips (inch/second); when satisfying A<DC≤B, V=14.5 ips; and when satisfying B<DC, V=8 ips. Here, it is assumed that conveyance speed V=14.5 ips is temporarily set.

Count value DC for each ink color means the count value for each ink color on the entire page. In the present embodiment, as illustrated in FIG. 10B, two thresholds C and D are prepared for each ink color. Then, for each ink color, when count value DC satisfies DC≤C, the conveyance speed is temporarily set as V=26 ips; when satisfying C<DC≤D, V=14.5 ips; and when satisfying D<DC, V=8 ips. Here, it is assumed that the conveyance speed for cyan is temporarily set as V=26 ips; for magenta, V=26 ips; for yellow, V=26 ips; and for black, V=14.5 ips, respectively.

Count value DC for each unit area means the total count value for all the ink colors in a unit area obtained by equally dividing the entire page in the conveyance direction. The dot count value of a unit area corresponds to power consumption per unit time. In the present embodiment, as illustrated in FIG. 10C, two thresholds E and F are prepared. When count value DC satisfies DC≤E, the conveyance speed is temporarily set as V=26 ips; when satisfying E<DC≤F, V=14.5 ips; and when satisfying F<DC, V=8 ips. Here, it is assumes that the conveyance speed is temporarily set as V=8 ips. Note that this conveyance speed V is set for each unit area.

At step S11, the print controller 202 acquires the multiple count values, which are count value DC for the entire page, four count value DC's for the four ink colors, as many unit-area count value DC's as the number of unit areas, as described above. Then, at step S12, the print controller 202 temporarily sets conveyance speed V's corresponding to the respective count values, based on the tables in FIGS. 10A to 10C, and further selects the minimum value among the temporarily set conveyance speed V's as conveyance speed Vb for the page for processing. The determined conveyance speed Vb is stored being associated with the page for processing.

In this way, by preparing multiple dot count values that are referred to when the conveyance speed and drive frequency are determined, it is possible to control print operation such that the power consumption is within a range of the specified capacity of the power source even when there is an ejection opening array (ink color) or a unit area that makes power consumption high locally. Note that in the present embodiment, it is assumed that tables as illustrated in FIG. 10 are stored in the ROM 203 of the print engine unit 200 in advance.

Returning to FIG. 9, at step S13, the print controller 202 determines whether the page for processing is the second or the subsequent page or not. In a case where the page for processing is the first page, the process jumps to step S16; in a case where it is the second or the subsequent page, the process proceeds to step S14.

At step S14, the print controller 202 determines whether conveyance speed Vb for the page for processing is equal to conveyance speed Va for the preceding page (Vb=Va). In a case where Vb=Va, the print controller 202 proceeds to step S15 and sets the conveyance mode of the page for processing to "continuous conveyance". On the other hand, in a case where Vb≠Va, the print controller 202 proceeds to step S16 and sets the conveyance mode of the page for processing to "single conveyance".

At the following step S17, the print controller 202 updates the conveyance speed from conveyance speed Va for the preceding page to conveyance speed Vb for the page for processing and stores the updated conveyance speed in the memory. Next, at step S18, the print controller 202 determines whether the page for processing is the last page of the print job. In a case where the page for processing is not the last page, the print controller 202 returns to step S10, sets the next page as the page for processing, and executes the series of the processes described above for the new page for processing. On the other hand, in a case where it is determined at step S18 that the page for processing is the last page, this process ends.

Here, description is provided for "single conveyance" and "continuous conveyance", which are types of conveyance mode. The "single conveyance" is a conveyance mode in which after the discharge process of the preceding page is completed, the conveyance operation of the page for processing starts. Specific description is provided referring to FIG. 8 again. When the page for processing is set to the "single conveyance" mode, the conveyance control unit 207 does not drive the first conveying motor 24 or the second conveying motor 25 for the page for processing until the detection member 20 positioned immediately upstream of the discharging roller 12 detects the trailing edge of the preceding page. Then, after the detection member 20 positioned immediately upstream of the discharging roller 12 detects the trailing edge of the preceding page, the conveyance control unit 207 drives the first conveying motor 24 or the second conveying motor 25 for the page for processing to start conveying the page for processing. Note that the feeding operation of the page for processing may be performed during the print operation of the preceding page, or may be started when driving the first conveying motor 24 or the second conveying motor 25 is started.

On the other hand, the "continuous conveyance" is a conveyance mode in which the conveyance operation of the page for processing starts during the conveyance operation of the preceding page.

FIGS. 11A and 11B are diagrams illustrating states during the "continuous conveyance". Here, in the illustration, the printing medium to which the page for processing is printed is the succeeding sheet S2, and the printing medium to which the page to be printed immediately before the page for processing is printed is the preceding sheet S1. Here, both sheets are fed from the first cassette 5A.

In the case where the page for processing is set to the "continuous conveyance" mode, when the detection member 20 immediately upstream of the main conveying roller 70 detects the trailing edge of the preceding sheet S1, the conveyance control unit 207 starts feeding the succeeding sheet S2, using the first feeding unit 6A. Then, the conveyance control unit 207 stops the first conveying motor 24 with the leading edge of the succeeding sheet S2 nipped by the first intermediate roller 71A and leaves the succeeding sheet S2 on standby.

At the same time, the conveyance control unit 207 drives the main conveying motor 26, fourth conveying motor 28, and discharging motor 29 according to the conveyance speed set for the preceding sheet S1 and continues the conveyance operation of the preceding sheet S1. At this time, the conveyance control unit 207 measures the distance by which the preceding sheet S1 is conveyed from the time when the above detection member 20 detects the trailing edge of the preceding sheet S1, using the count value of the encoder 21. Then, when the above conveyance distance reaches a specified distance PL, the conveyance control unit 207 drives the first conveying motor 24 to start the conveyance operation of the succeeding sheet S2. FIG. 11A illustrates the conveyance state when the conveyance operation of the succeeding sheet S2 starts.

FIG. 11B illustrates a state where the conveyance has progressed further from the state in FIG. 11A. The preceding sheet S1 is conveyed by driving the fourth conveying motor 28 and the discharging motor 29, and the succeeding sheet S2 is conveyed by driving the first conveying motor 24 and the main conveying motor 26. For the distance between the trailing edge of the preceding sheet and the leading edge of the succeeding sheet, if both conveyance speeds are the same, the above specified distance PL is basically kept.

As described above, the "continuous conveyance" means a conveyance operation in which while the preceding sheet S1 is being conveyed in the conveying path, the conveyance operation of the succeeding sheet S2 is started with the distance to the preceding sheet S1 kept larger than or equal to a certain distance.

FIGS. 12A to 12C are diagrams illustrating conveyance examples performed by the conveyance control unit 207 based on the conveyance speed and conveyance mode set for each page according to the conveyance mode setting process described with reference to FIG. 9.

FIG. 12A illustrates a case where the conveyance speeds are set to the same values (26 ips) for all the four pages included in a print job. In this case, the first page is set to the "single conveyance" mode at step S16. All the other pages from the second page are set to the "continuous conveyance" mode at step S15.

Specifically, as illustrated in FIGS. 11A and 11B, while the conveyance operation of the first page is being performed at a conveyance speed of 26 ips, the conveyance operation of the second page is started at the same speed with an interval of distance PL, and in the same way, the conveyance operations of the third page and the fourth page are started one after another. With this configuration, the four pages are conveyed at equal intervals and at the same speed, and thus there is little concern that a paper jam or the like occurs.

FIG. 12B illustrates a case where, of the four pages included in a print job, the conveyance speed of the first and second pages is set at 26 ips, and the conveyance speed of the third and fourth pages is set at 8 ips. In this case, the first and third pages are set to the "single conveyance" mode at step S16. The second and fourth pages are set to the "continuous conveyance" mode at step S15.

Specifically, while the first page is being conveyed at a conveyance speed of 26 ips, the conveyance operation of the second page is started at the same speed with an interval of distance PL. Then, when the conveyance operation of the second page is completed, the conveyance operation of the third page is started at a conveyance speed of 8 ips, and during this conveyance operation, the conveyance operation of the fourth page is started with an interval of distance PL at a conveyance speed of 8 ips. In other words, after the process of conveying two pages at an identical speed keeping a constant interval is completed, the process of conveying another set of two pages at an identical speed keeping a constant interval is performed. Thus, there is little concern that a paper jam or the like occurs.

FIG. 12C illustrates a case where, of the three pages included in a print job, the conveyance speed of the first and third pages is set at 26 ips, and the conveyance speed of the second page is set at 8 ips. In this case, all the pages 1 to 3 are set to the "single conveyance" mode at step S16.

Specifically, after the conveyance operation of the first page at a conveyance speed of 26 ips is completed, the conveyance operation of the second page is started at a conveyance speed of 8 ips. After the conveyance operation of the second page is completed, the conveyance operation of the third page is started at a conveyance speed of 26 ips. As described above, since the all the three sheets respectively corresponding to the three pages are conveyed in the "single conveyance" mode, there is little concern that a paper jam or the like occurs.

As has been described, even when the conveyance speeds of sheets conveyed in order are different from each other, the present embodiment makes it possible to perform continuous printing on each sheet efficiently without causing a paper jam or the like.

Second Embodiment

Also in the present embodiment, the inkjet printing apparatus illustrated in FIGS. 1 to 8 is used as in the first embodiment.

Figure 13:
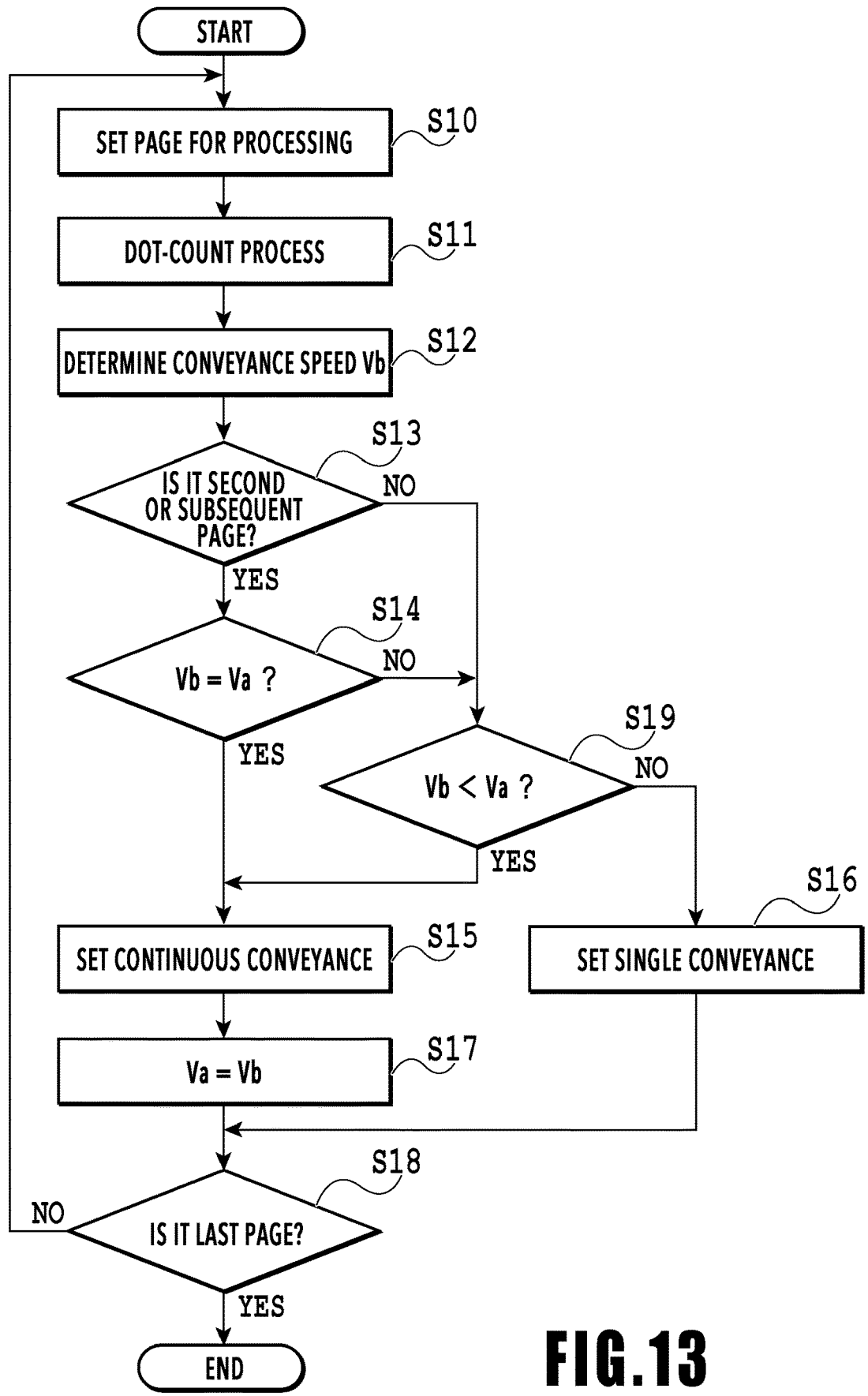
FIG. 13 is a flowchart illustrating a conveyance mode setting process in a second embodiment.

FIG. 13 is a flowchart for explaining a conveyance mode setting process executed by the print controller 202 of the present embodiment. This process is different from the first embodiment described with reference to FIG. 9 in that this process has an additional step S19.

In a case of Vb≠Va, at step S14, the print controller 202 proceeds to step S19 and determines whether conveyance speed Vb for the page for processing is lower than conveyance speed Va for the preceding page (Vb<Va). In a case of Vb<Va, it is unlikely that the succeeding sheet S2 at relatively lower conveyance speed Vb catches up with the preceding sheet S1 at a relatively higher conveyance speed. Thus, the print controller 202 proceeds to step S15 and sets the page for processing to the "continuous conveyance" mode. On the other hand, in a case of Vb>Va, it is highly likely that the succeeding sheet S2 at the relatively higher conveyance speed Vb catches up with the preceding sheet S1 at a relatively lower conveyance speed. Thus, the print controller 202 proceeds to step S16 and sets the page for processing to the "single conveyance" mode. The other steps are the same as those in FIG. 9.

Figure 14:
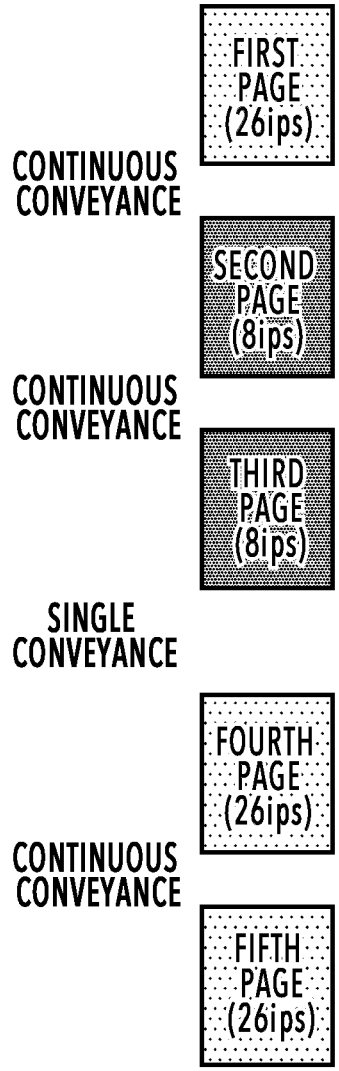
FIG. 14 is a diagram illustrating a conveyance example in the second embodiment.

FIG. 14 is a diagram illustrating an example of conveyance performed by the conveyance control unit 207 based on the conveyance speed and conveyance mode set for each page by the conveyance mode setting process illustrated in FIG. 13. Here, of the five pages included in a print job, the conveyance speed of the first, fourth, and fifth pages is set at 26 ips, and the conveyance speed of the second and third pages is set at 8 ips. In this case, the first and fourth pages are set to the "single conveyance" mode at step S16. The second, third, and fifth pages are set to the "continuous conveyance" mode at step S15.

Specifically, while the conveyance operation of the first page is being performed at a conveyance speed of 26 ips, the conveyance operation of the second page starts at a conveyance speed of 8 ips with an interval of distance PL. After that, while the conveyance operation of the second page is being performed at a conveyance speed of 8 ips, the conveyance operation of the third page starts next at a conveyance speed of 8 ips with an interval of distance PL. After that, after the conveyance operation of the third page is completed, the conveyance operation of the fourth page starts at a conveyance speed of 26 ips. During this conveyance operation, the conveyance operation of the fifth page starts at a conveyance speed of 26 ips with an interval of distance PL.

As described above, in the case where the conveyance speed of the succeeding sheet is lower than or equal to that of the preceding sheet, it is unlikely that the succeeding sheet catches up with the preceding sheet. Thus, in the present embodiment, the succeeding sheet is set to the "continuous conveyance" mode. In the case where the conveyance speed of the succeeding sheet is higher than that of the preceding sheet, it is highly likely that the succeeding sheet catches up with the preceding sheet. Thus, the succeeding sheet is set to the "single conveyance" mode. With this configuration, this embodiment makes it possible to perform continuous printing more efficiently than in the first embodiment while providing the same advantageous effect as in the first embodiment.

Third Embodiment

Also in the present embodiment, the inkjet printing apparatus illustrated in FIGS. 1 to 8 is used as in the first embodiment. Here, in the present embodiment, the conveyance mode of all the pages is basically set to the "continuous conveyance" mode, but the distance between the preceding sheet and the succeeding sheet is adjusted based on the relative relationship between the two sheets.

Figure 15:
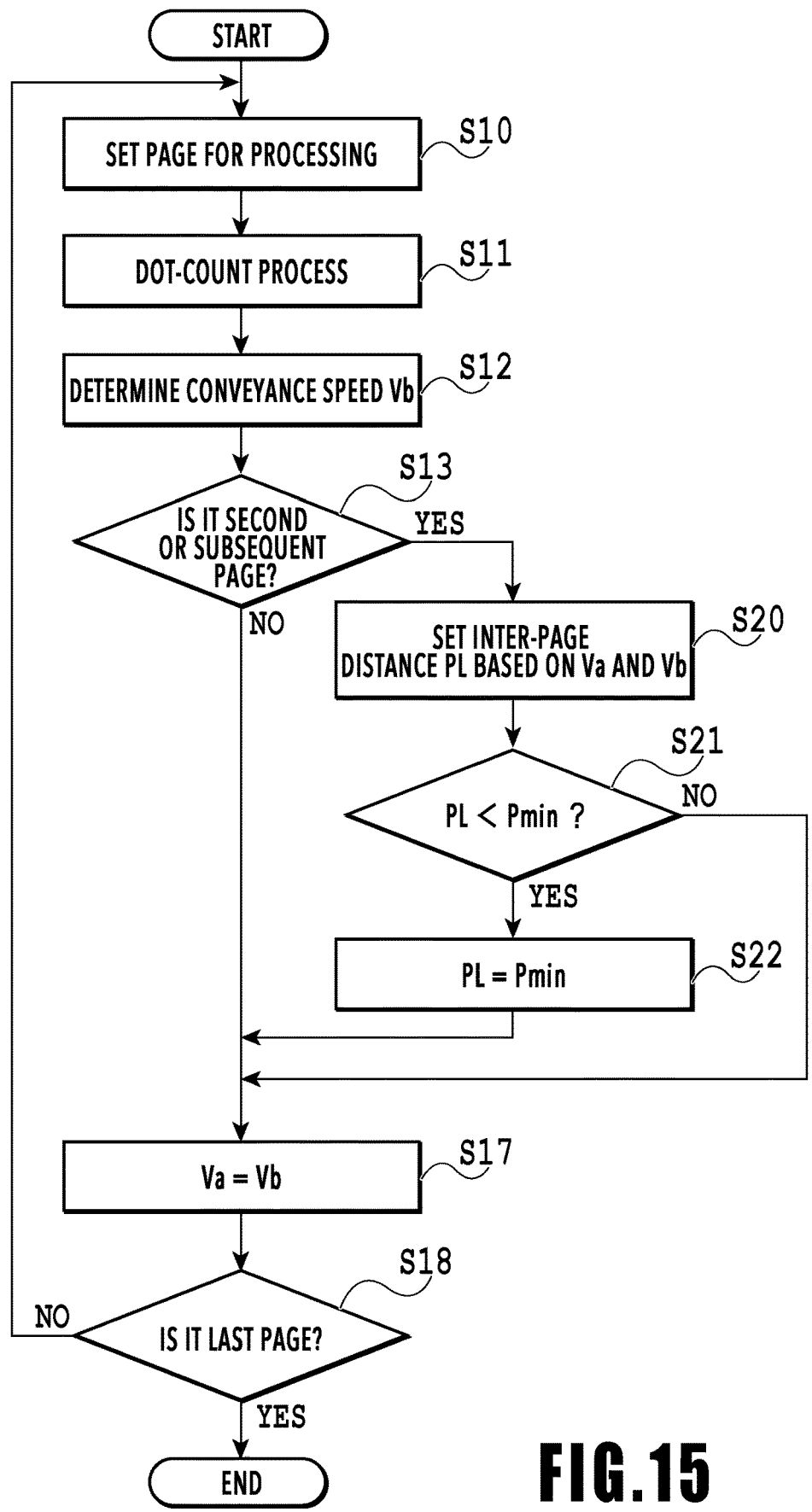
FIG. 15 is a flowchart illustrating a conveyance mode setting process in a third embodiment.

FIG. 15 is a flowchart for explaining a conveyance mode setting process executed by the print controller 202 of the present embodiment. The processes at steps S10 to S13 are the same as those in the first embodiment, and here description thereof is omitted.

When the print controller 202 judges at step S13 that the page for processing is the second or the subsequent page, the print controller 202 proceeds to step S20 and sets inter-page distance PL based on conveyance speed Vb for the page for processing and conveyance speed Va for the preceding sheet.

FIG. 16 is a diagram illustrating an inter-page distance PL setting table which the print controller 202 refers to at step S20. In the present embodiment, such a table is stored in advance in the ROM 203 of the print engine unit 200.

For example, in a case where conveyance speed Vb for the succeeding sheet and conveyance speed Va for the preceding sheet both are at 26 ips, inter-page distance PL is set to PL1. In a case where conveyance speed Vb for the succeeding sheet and conveyance speed Va for the preceding sheet both are at 14.5 ips, inter-page distance PL is set to PL2. In a case where conveyance speed Vb for the succeeding sheet and conveyance speed Va for the preceding sheet both are at 8 ips, inter-page distance PL is set to PL3. PL1, PL2, and PL3 are adjustable values according to the size and type of a sheet (printing medium) and basically have the relationship of PL1>PL2>PL3. Specifically, for example, in the case where the sheet is of A4 size, PL1 is approximately 87 mm, PL2 approximately 62 mm, and PL3 approximately 48 mm.

As has been described with reference to FIGS. 11A and 11B, when two sheets are conveyed simultaneously in the conveyance path, distance PL between the sheets may vary depending on the variation in the driving force of various conveying motors and the diameters of the conveying rollers. The variation is larger when the conveyance speed is higher. Thus, it is desirable that distance PL between the sheets be a distance large enough for the succeeding sheet not to catch up with the preceding sheet even when such variation occurs. On the other hand, if the inter-sheet distance PL is set too large, even the continuous conveyance will not improve the throughput. Thus, in the present embodiment, inter-sheet distance PL in the case where the conveyance speeds of the preceding sheet and the succeeding sheet are equal (Va=Vb) is set for each conveyance speed. When the conveyance speed is low, inter-sheet distance PL is set as low as possible to improve the throughput.

On the other hand, in the case where the conveyance speeds of the preceding sheet and the succeeding sheet are different, the print controller 202 sets inter-page distance PL based on the formulae shown in FIG. 16. For example, in a case where conveyance speed Vb for the succeeding sheet is lower than conveyance speed Va for the preceding sheet, it is unlikely that the succeeding sheet catches up with the preceding sheet. Thus, inter-page distance PL is set to a value lower than when the conveyance speeds of the preceding sheet and the succeeding sheet are equal to each other. On the other hand, when conveyance speed Vb for the succeeding sheet is higher than conveyance speed Va for the preceding sheet, it is highly likely that the succeeding sheet catches up with the preceding sheet. Thus, inter-page distance PL is set to a value larger than when the conveyance speeds of the preceding sheet and the succeeding sheet are equal to each other. In this way, an appropriate inter-page distance PL is set at step S20 according to the combination of the conveyance speeds of the preceding sheet and the succeeding sheet.

After inter-page distance PL is set at step S20, the print controller 202 proceeds to step S21 and determines whether inter-page distance PL set at step S20 is smaller than minimum inter-page distance PLmin set in advance. Here, minimum inter-page distance PLmin is the minimum distance with which the conveyance of the preceding page and the following page can be individually controlled, which is determined by the arrangement of the conveying rollers 7 and the detection members 20. Specifically, minimum inter-page distance PLmin needs to be larger than the distance of the farthest combination of all the combinations of adjacent two detection members 20. In addition, minimum inter-page distance PLmin also needs to be a distance that does not cause a situation in which multiple conveying rollers driven by a common conveying motor convey both the preceding sheet and the succeeding sheet.

In the case where it is determined at step S21 that PL<PLmin, inter-page distance PL currently set does not allow for a normal conveyance operation. Thus, the print controller 202 proceeds to step S22, changes inter-page distance PL to minimum inter-page distance PLmin, and proceeds to step S17. On the other hand, in the case where it is determined at step S21 that PL≥PLmin, the print controller 202 keeps the current inter-page distance PL and proceeds to step S17. The processes after this process are the same as those in the first embodiment, and thus description thereof is omitted.

Figure 17:
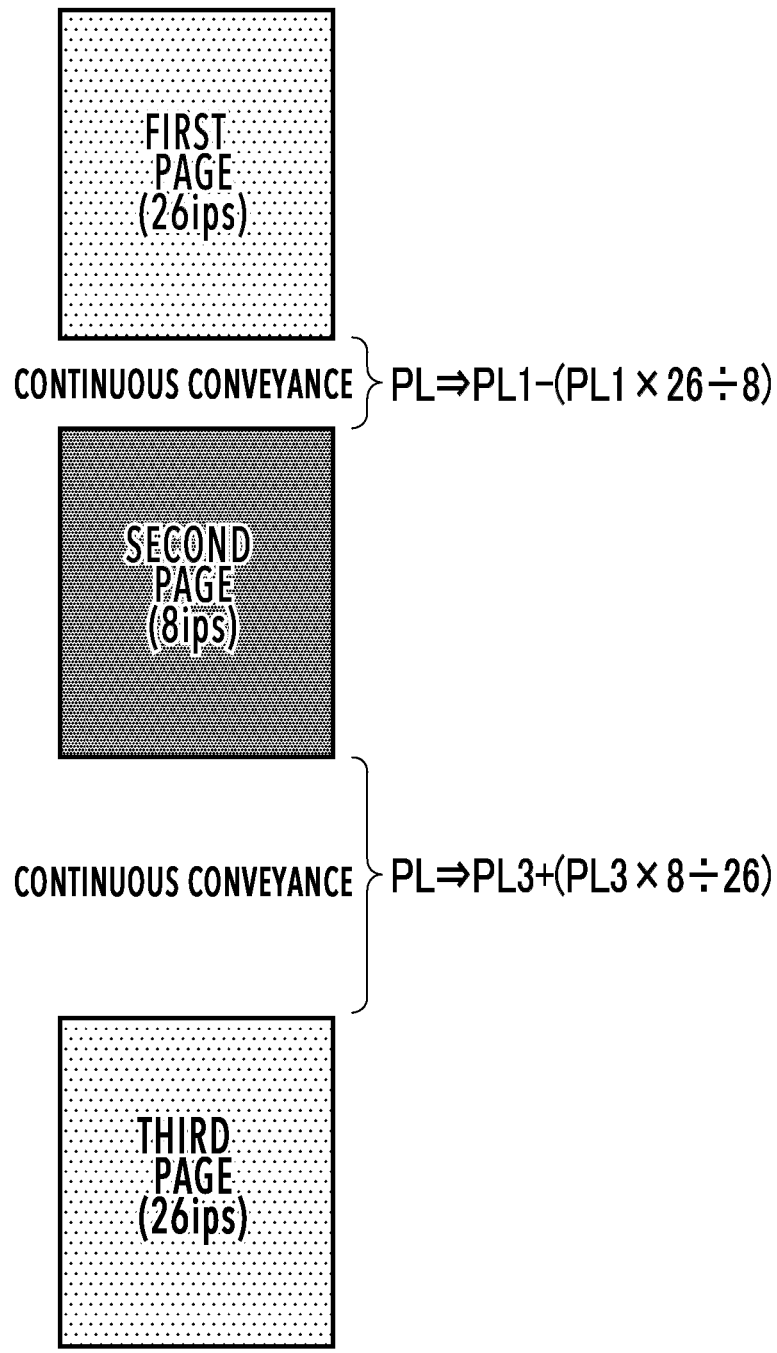
FIG. 17 is a diagram illustrating a conveyance example in the third embodiment.

FIG. 17 is a diagram illustrating an example of conveyance performed by the conveyance control unit 207 based on the conveyance speed and conveyance mode set for each page by the conveyance mode setting process illustrated in FIG. 15. Here, of the three pages included in a print job, the conveyance speed of the first and third pages is set at 26 ips, and the conveyance speed of the second page is set at 8 ips. In the present embodiment, the "continuous conveyance" is performed for all the pages, but the length of inter-page distance PL is adjusted according to the conveyance speeds of the preceding page and the following page. In the figure, since the conveyance speed of the second page is lower than that of the first page, inter-page distance PL between the first page and the second page is adjusted to be a value smaller than PL1 accordingly. Since the conveyance speed of the third page is higher than that of the second page, inter-page distance PL between the second page and the third page is adjusted to be a value larger than PL3 accordingly.

As described above, in the present embodiment, although the "continuous conveyance" is performed for all the pages, inter-page distance PL between the preceding sheet and the succeeding sheet is appropriately adjusted according to the combination of the conveyance speeds of the preceding sheet and the succeeding sheet. With this configuration, this embodiment makes it possible to perform continuous printing more efficiently.

Note that although, in the above, the drive frequency of the print head and the conveyance speed of the printing medium are adjusted for the purpose that power consumption will not exceed the specified capacity of the power source provided for the printing apparatus, the present invention is not limited to this case. For example, it is known that an inkjet print head has a limit to the drive frequency (refill frequency) for performing normal ejection operation at each ejection opening. Thus, the drive frequency of the print head and the conveyance speed of the printing medium may be adjusted not to exceed this limit. In addition, in the case where the temperature of the print head or the type of printing medium changes on an individual page basis, the drive frequency of the print head and the conveyance speed of the printing medium may be adjusted according to the temperature and the type. In any case, the present invention fully provides the advantageous effect in the situation where the conveyance speed is set on an individual page basis when printing multiple pages continuously.

In the above, the description has been provided for the configuration in which the print controller 202 of the print engine unit 200 sets the conveyance speed and conveyance mode for each page and the inter-page distance, and the conveyance control unit 207 performs conveyance control based on the set values. However, the present invention is not limited to this configuration. For example, the conveyance mode setting process described using the above flowcharts may be performed by the main controller 101 or image processing unit 108 of the controller unit 100. In this case, the conveyance speed and conveyance mode for each of the multiple pages included in a job and other information are transferred to the print engine unit together with the print data of each of the multiple pages.

In addition, in the above, the description has been provided for the configuration in which after the print controller 202 sets the conveyance speed and conveyance mode for all the pages, the conveyance control unit 207 performs conveyance control continuously for all the pages based on the set values. However, the present invention is also not limited to this configuration. Using, as a trigger, the time when the print controller 202 sets the conveyance speed and conveyance mode for a page, the conveyance control unit 207 may start the feeding operation and conveyance control for the page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-243016 filed Dec. 19, 2017, which is hereby incorporated by reference herein in its entirety.

What is claimed is:

1. A printing apparatus comprising:
a conveyance unit configured to convey printing media including a first printing medium and a second printing medium that follows the first printing medium along a conveying path;
a print unit disposed in the conveying path and configured to print on a print area of each of the printing media according to print data; and
a control unit configured to control the conveyance unit,
wherein the control unit compares a first conveyance speed at the print area of the first printing medium and a second conveyance speed at the print area of the second printing medium, and
wherein in a case in which the second conveyance speed is higher than the first conveyance speed, the control unit starts conveyance of the second printing medium after the first printing medium is discharged from the conveying path.

2. The printing apparatus according to claim 1, wherein in a case in which the second conveyance speed is equal to the first conveyance speed, the control unit starts conveyance of the second printing medium before the first printing medium is discharged from the conveying path.

3. The printing apparatus according to claim 2, wherein in a case in which the second conveyance speed is lower than the first conveyance speed, the control unit starts conveyance of the second printing medium while the first printing medium is being conveyed in the conveying path.

4. The printing apparatus according to claim 2, wherein the control unit is further configured to set the first conveyance speed according to first print data and set the second conveyance speed according to second print data.

5. The printing apparatus according to claim 4, wherein the control unit sets the first conveyance speed based on a result of counting a number of dots to be printed by the print unit according to the first print data, and sets the second conveyance speed based on a result of counting a number of dots to be printed by the print unit according to the second print data, and
the larger a count value indicating each of the results of counting, the lower the speed at which the control unit sets the corresponding one of the first conveyance speed and the second conveyance speed.

6. The printing apparatus according to claim 1, wherein in a case in which the second conveyance speed is lower than the first conveyance speed, the control unit starts conveyance of the second printing medium while the first printing medium is being conveyed in the conveying path.

7. The printing apparatus according to claim 1, wherein the control unit is further configured to set the first conveyance speed according to first print data and set the second conveyance speed according to second print data.

8. The printing apparatus according to claim 7, wherein the first print data and the second print data are included in the same print job.

9. The printing apparatus according to claim 1, further comprising:
a feeding unit configured to feed a printing medium from a cassette in which a plurality of the printing media are stored and guide a leading edge of the printing medium to the conveying path, wherein
while the conveyance unit is conveying the first printing medium in the conveying path, the control unit causes the feeding unit to feed a leading edge of the second printing medium to the conveying path.

10. The printing apparatus according to claim 1, wherein the print unit is provided with a line type print head.

11. The printing apparatus according to claim 1, further comprising a tray configured to stack printing media discharged from the conveying path, wherein
in the case in which the second conveyance speed is higher than the first conveyance speed, the control unit controls the conveyance unit such that a conveyance operation of the second printing medium starts after the first printing medium is discharged to the tray from the conveying path.

12. The printing apparatus according to claim 1, wherein the conveyance unit includes a first conveyance roller driven by a first motor and a second conveyance roller driven by a second motor, and wherein
the first conveyance roller is arranged upstream of the print unit and the second conveyance roller is arranged downstream of the print unit.

13. The printing apparatus according to claim 1, wherein the printing media passed through the conveying path are discharged by a discharging roller.

14. A printing method comprising:
conveying printing media including a first printing medium and a second printing medium that follows the first printing medium along a conveying path;
printing on a print area of each of the printing media according to print data by using a print unit disposed in the conveying path; and
controlling the conveying step,
wherein, in the controlling step, a first conveyance speed at the print area of the first printing medium and a second conveyance speed at the print area of the second printing medium are compared, and
wherein in a case in which the second conveyance speed is higher than the first conveyance speed, conveyance of the second printing medium is started after the first printing medium is discharged from the conveying path.

15. The printing method according to claim 14, wherein in a case in which the second conveyance speed is equal to the first conveyance speed, the conveyance of the second printing medium is started before the first printing medium is discharged from the conveying path.

16. The printing method according to claim 15, wherein in a case in which the second conveyance speed is lower than the first conveyance speed, the conveyance of the second printing medium is started while the first printing medium is being conveyed in the conveying path.

17. The printing method according to claim 15, wherein, in the controlling step, the first conveyance speed is set according to first print data and the second conveyance speed is set according to second print data.

18. The printing method according to claim 17, wherein, in the controlling step, the first conveyance speed is set based on a result of counting a number of dots to be printed by the print unit according to the first print data, and the second conveyance speed is set based on a result of counting a number of dots to be printed by the print unit according to the second print data, and the larger a count value indicating each of the results of counting, the lower the speed is set corresponding one of the first conveyance speed and the second conveyance speed.

19. The printing method according to claim 14, wherein in a case in which the second conveyance speed is lower than the first conveyance speed, the conveyance of the second printing medium is started while the first printing medium is being conveyed in the conveying path.

20. The printing method according to claim 14, wherein the first conveyance speed is set according to first print data and the second conveyance speed is set according to second print data.

21. The printing method according to claim 20, wherein the first print data and the second print data are included in the same print job.

22. The printing method according to claim 14, wherein
in the conveying step, the printing media are conveyed by a first conveyance roller driven by a first motor and a second conveyance roller driven by a second motor, and wherein
the first conveyance roller is arranged upstream of the print unit and the second conveyance roller is arranged downstream of the print unit.

23. The printing method according to claim 14, wherein the printing media passed through the conveying path are discharged by a discharging roller.

* * * * *